(12) United States Patent
Nakamoto (10) Patent No.: US 6,381,132 B1
(45) Date of Patent: Apr. 30, 2002

(54) DATA PROCESSING APPARATUS (75) Inventor: Nobuya Nakamoto, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/175,119

(22) Filed: Oct. 19, 1998

(30) Foreign Application Priority Data

Oct. 20, 1997 (JP) ............................................ 9-287287

(51) Int. Cl.⁷ ................................................ G06F 1/16
(52) U.S. Cl. .................................... 361/686; 361/683
(58) Field of Search ................................ 361/686, 683, 361/681; 312/223.1, 223.2

(56) References Cited

U.S. PATENT DOCUMENTS

| 5,347,424 A | * | 9/1994 | Akahane ..................... 361/680 |
| 5,410,447 A | * | 4/1995 | Miyagawa et al. ......... 361/681 |
| 5,805,412 A | * | 9/1998 | Yanagisawa et al. ....... 361/686 |
| 6,029,215 A | * | 2/2000 | Watt, Jr. et al. ............. 710/101 |

FOREIGN PATENT DOCUMENTS

| JP | 60-53360 | 3/1985 |
| JP | 5-313786 | 11/1993 |
| JP | 6-60081 | 3/1994 |
| JP | 7-84677 | 3/1995 |
| JP | 7-319598 | 12/1995 |
| JP | 9-101842 | 4/1997 |
| JP | 9-190395 | 7/1997 |
| JP | 10-187280 | 7/1998 |

OTHER PUBLICATIONS

Japanese Office Action issued Sep. 5, 2000 in a related application with English translation of relevant portions.

* cited by examiner

*Primary Examiner*—Leo P. Picard
*Assistant Examiner*—Lisa Lea-Edmonds
(74) *Attorney, Agent, or Firm*—Ostrolenk, Faber, Gerb & Soffen, LLP (57) ABSTRACT A data processing apparatus of the present invention includes an apparatus body and a portable terminal connectable to the apparatus body as a keyboard. The portable terminal is separable from the apparatus body and is operable as a data terminal alone. The portable terminal functions as a keyboard and a storage when mounted to the apparatus body. The apparatus is easy to carry and capable of sharing, e.g., schedule data with a desk-top personal computer.

13 Claims, 5 Drawing Sheets

DATA PROCESSING APPARATUS

BACKGROUND OF THE INVENTION

The present invention relates to a word processor, personal computer or similar data processing apparatus and, more particularly, to a portable data processing apparatus.

Today, a data processing apparatus including a keyboard fully separable from its body is extensively used and disclosed in, e.g., Japanese Patent Laid-Open Publication No. 60-53360. The apparatus taught in this document is made up of an apparatus body and a keyboard fully separate from each other and capable of performing cordless communication. While cordless communication is generally implemented by a radio wave, infrared beam, acoustic wave or similar signal, the above apparatus uses an infrared beam. However, this conventional apparatus gives no consideration to portability although having the keyboard fully separate from the apparatus body promotes easy operation.

Japanese Patent Laid-Open Publication No. 5-313786 discloses a data processing apparatus including an apparatus body, a display/input device, a floppy disk drive or similar auxiliary storage, a keyboard separable from the apparatus body, and a support. The apparatus body includes a power source device, a CPU (Central Processing Unit), and various control sections for executing various kinds of processing under the control of the CPU. The display/input device has an LCD (Liquid Crystal Display) and a pressure-sensitive touch screen mounted on the LCD that allows data to be input by use of a pen. The operator of the apparatus is capable of inputting data on the keyboard or inputting data on the display/input device with a pen, as desired. This apparatus is desirable in portability because it is operable without the keyboard. However, the user should input data with a pen at all times while carrying the apparatus. This degrades manipulability in the event of, e.g., editing, compared to the operation with the keyboard.

Further, when the above conventional data processing apparatuses each is used as a portable data terminal, it is used in combination with a desk-top personal computer due to a processing ability available therewith. In addition, the data terminal and apparatus body each should be provided with the respective schedule data file and therefore cannot share the same schedule data file with a desk-top personal computer.

SUMMARY OF THE INVENTION

It is therefore an object of the present invention to provide a data processing apparatus that is easy to carry and is capable of sharing, e.g., schedule data with a desk-top personal computer.

A data processing apparatus of the present invention includes an apparatus body, and a portable terminal connectable to the apparatus body as a keyboard. The portable terminal is separable from the apparatus body and is operable as a data terminal alone. The portable terminal functions as a keyboard and a storage when mounted to the apparatus body.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

Figure 1:
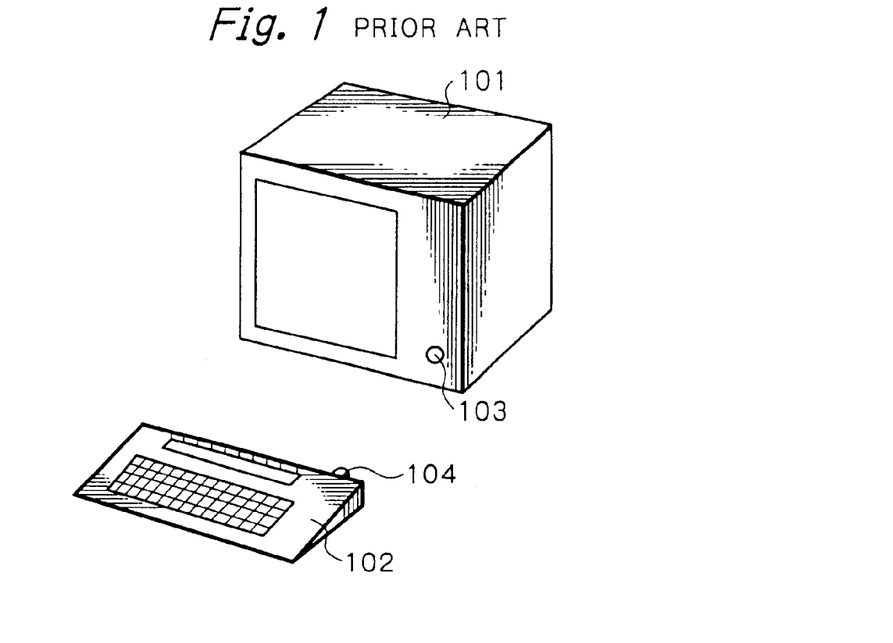
FIG. 1 is an external perspective view showing a conventional data processing apparatus.

To better understand the present invention, brief reference will be made to a conventional data processing apparatus, shown in FIG. 1. The apparatus to be described is taught in Japanese Patent Laid-Open Publication No. 60-53360 mentioned earlier. As shown, the apparatus is made up of an apparatus body 101 and a keyboard 102 fully separate from each other and capable of performing cordless communication. While cordless communication is generally implemented by a radio wave, infrared beam, acoustic wave or similar signal, the apparatus shown in FIG. 1 uses an infrared beam.

Figure 2:
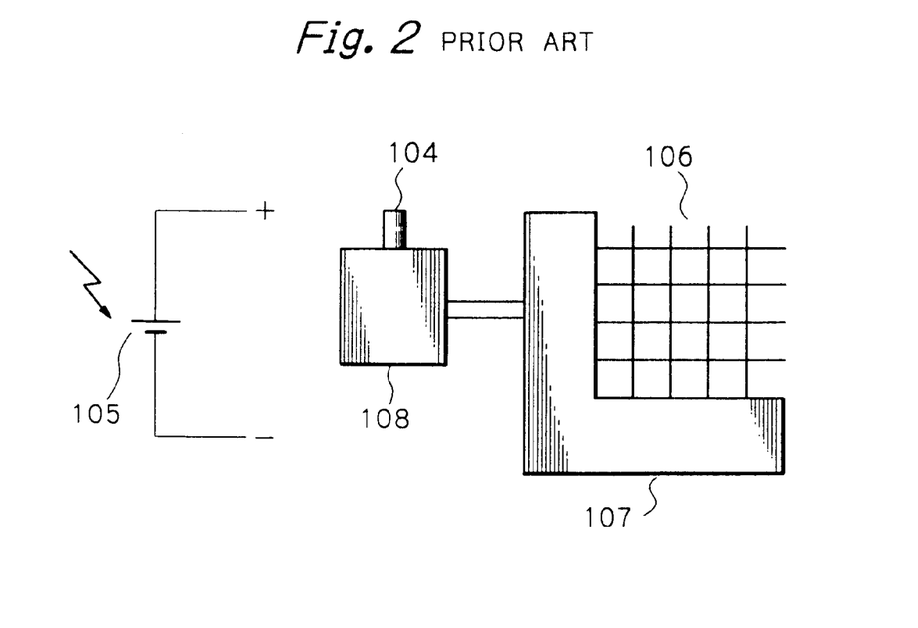
FIG. 2 shows circuitry included in the apparatus of FIG. 1.

The apparatus body 101 and keyboard 102 include emitting/receiving sections 103 and 104, respectively. The emitting/receiving sections 103 and 104 face each other when the apparatus body 101 and keyboard 102 are positioned in a preselected manner relative to each other. An infrared beam (signal) emitted from one of the emitting/receiving sections 103 and 104 is incident to the other light emitting/receiving section. As shown in FIG. 2, the keyboard 102 includes a solar battery 105 for feeding power to circuitry built in the keyboard 102.

Specifically, as shown in FIG. 2, the keyboard 102 includes a key matrix 106 constituting key switches, a keyboard control circuit 107, and a transmit/receive circuit 108 implemented by CMOS (Complementary Metal Oxide Semiconductor) devices. As long as more than a preselected quantity of light is incident to the solar battery 105, the battery 105 is capable of feeding power to the keyboard control circuit 107. The keyboard control circuit 107 transforms an input on the key matrix 106 to a suitable code. The transmit/receive circuit 108 performs a suitable modulation with the code output from the keyboard control circuit 107. As a result, an optical signal corresponding to the modulated signal is emitted from the emitting/receiving section 104 and is incident upon to the emitting/receiving section 103 of the apparatus body 101.

Figure 3:
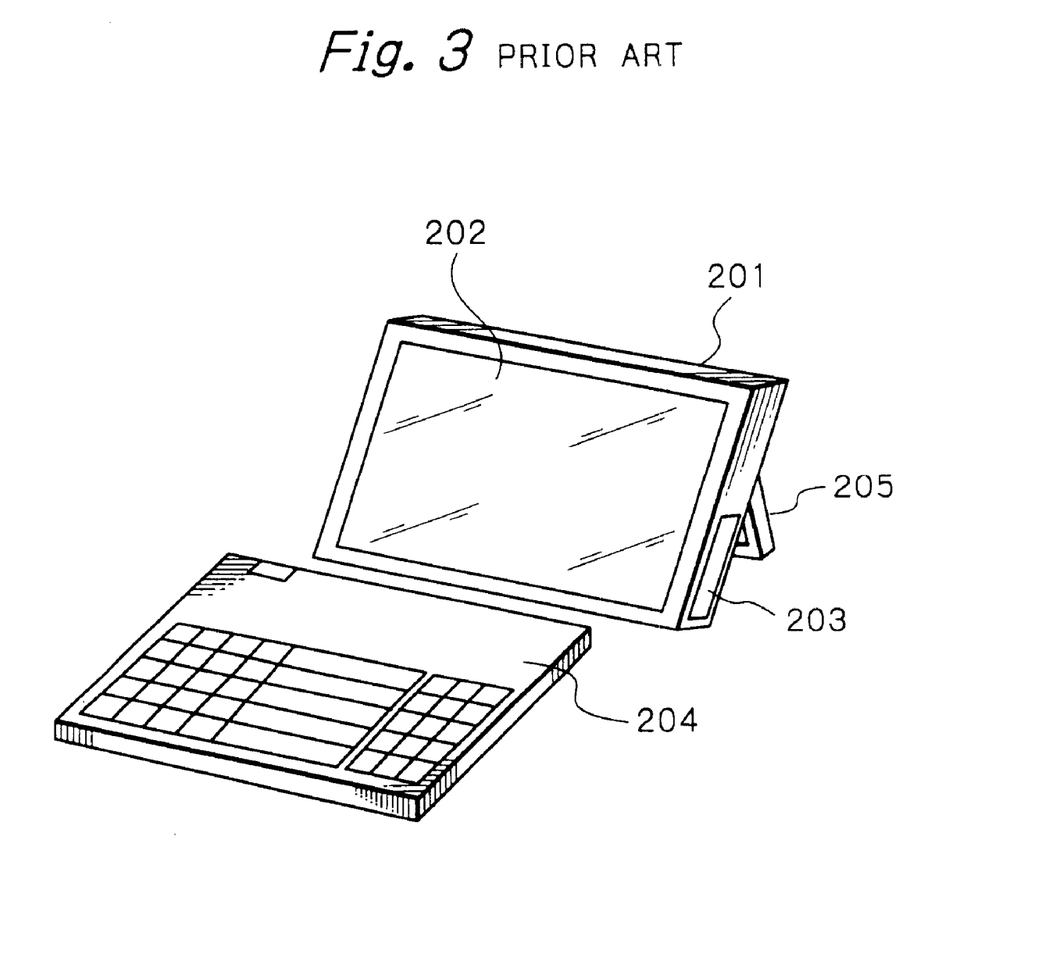
FIG. 3 is an external perspective view showing another conventional data processing apparatus.

FIG. 3 shows another conventional data processing apparatus taught in Japanese Patent Laid-Open Publication No. 5-313786 also mentioned earlier. As shown, the apparatus includes an apparatus body 201, a display/input device 202, a floppy disk drive or similar auxiliary storage 203, a keyboard 204 separable from the apparatus body 201, and a support 205. The apparatus body 201 includes a power source device, a CPU, and various control sections for executing various kinds of processing under the control of the CPU, although not shown specifically. The display/input device 202 has an LCD and a pressure-sensitive touch screen mounted on the LCD and allows data to be input by use of a pen. The operator of the apparatus is capable of inputting data on the keyboard 204 or inputting data on the display/input device 202 with a pen, as desired.

The conventional data processing apparatuses described above each has some problems left unsolved, as stated earlier. Specifically, the apparatus shown in FIGS. 1 and 2 gives no consideration to portability although having the keyboard 102 fully separate from the apparatus body 101 promotes easy operation. The apparatus shown in FIG. 3 is desirable in portability because it is operable without the keyboard 204. However, the user of the apparatus shown in FIG. 3 should input data with a pen at all times while carrying the apparatus. This degrades manipulability in the event of, e.g., editing, compared to the operation with the keyboard 204.

Figure 4A:
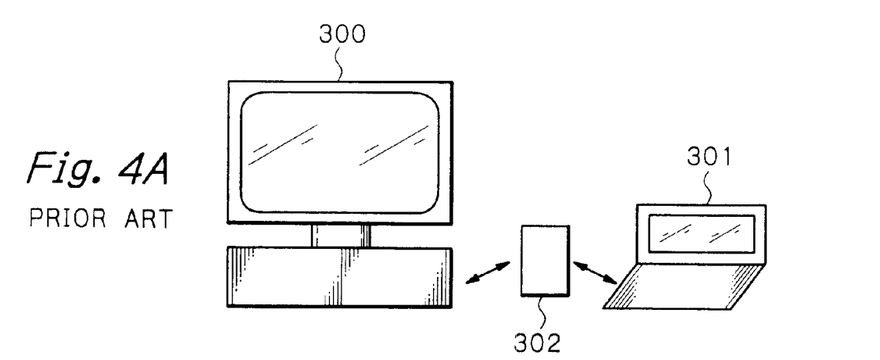
FIGS. 4A, 4B and 4C each shows a particular configuration in which the conventional apparatuses each is used in combination with a desk-top personal computer.
Figure 4B:
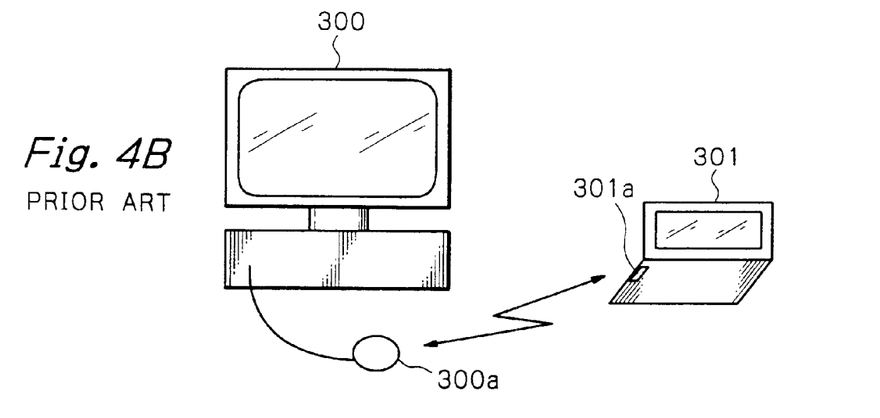
Figure 4C:
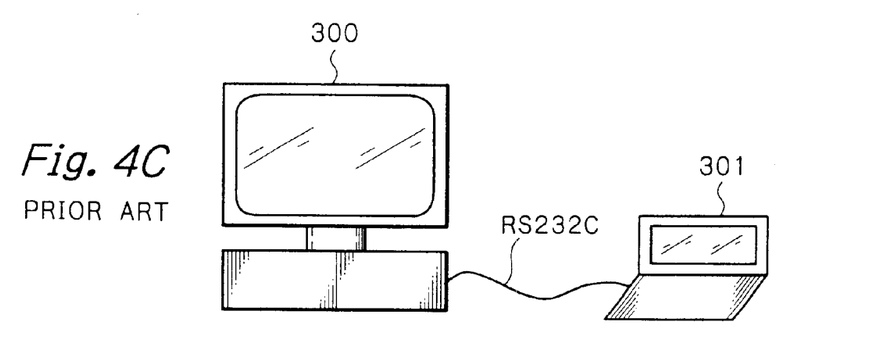

Further, when the above conventional data processing apparatuses each is used as a portable data terminal, it is used in combination with a desk-top personal computer in any one of three different configurations shown in FIGS. 4A, 4B and 4C. These configurations facilitate processing of data.

In FIG. 4A, a memory card 302 storing, e.g., a schedule data file, is shared by a personal computer 300 and a portable data terminal 301. The memory card 302 is inserted in the personal computer 300 when personal computer 300 and portable data terminal 301 are combined or inserted in the portable data terminal 301 when these devices are separated. This configuration has a drawback that not only a memory card interface (I/F) is necessary, but also the personal computer needs a memory card I/F.

In FIG. 4B, the personal computer 300 and portable data terminal 301 include infrared beam emitting/receiving sections 300a and 301a, respectively. In this case, a schedule data file must be transferred by use of exclusive transfer software.

In FIG. 4C, the personal computer 300 and portable data terminal 301 are connected to each other by a cable RS232C. This configuration has a problem that a schedule data file cannot be transferred without resorting to a serial port and exclusive transfer software.

Moreover, in any one of the configurations shown in FIGS. 4A–4C, the data terminal and apparatus body each should be provided with the respective schedule data file and therefore cannot share the same schedule data file with a desk-top personal computer.

Figure 5:
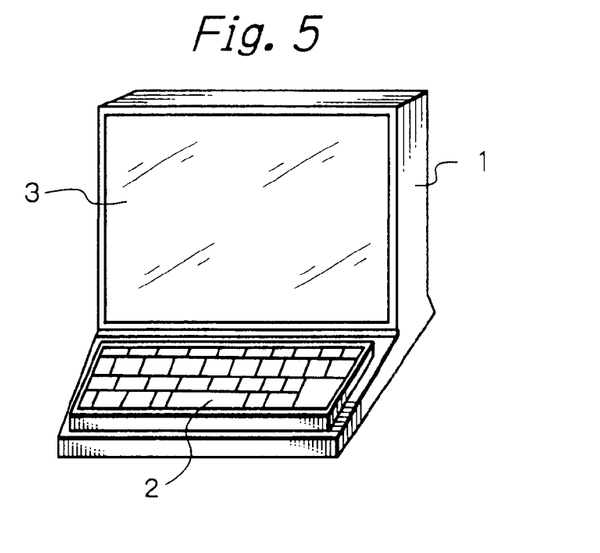
FIG. 5 is an external perspective view showing a data processing apparatus embodying the present invention.

Referring to FIG. 5, a data processing device embodying the present invention will be described. As shown, the apparatus is made of an apparatus body 1 and a portable terminal 2 implemented as a keyboard. An LCD 3 is mounted on the apparatus body 1 so as to display data input on the portable terminal 2. The portable terminal 2 is separable from the apparatus body 1 so that it can serve as a data terminal alone.

Figure 6A:
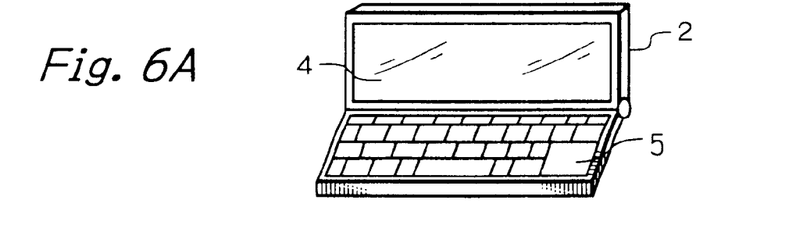
FIGS. 6A, 6B and 6C each shows a particular configuration in which the apparatus of FIG. 5 is used.
Figure 6B:
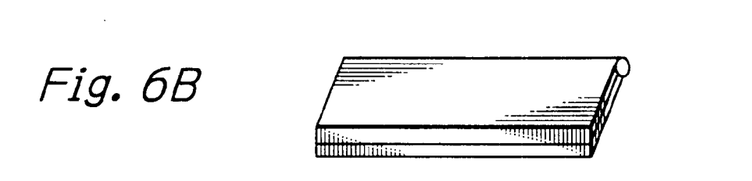
Figure 6C:
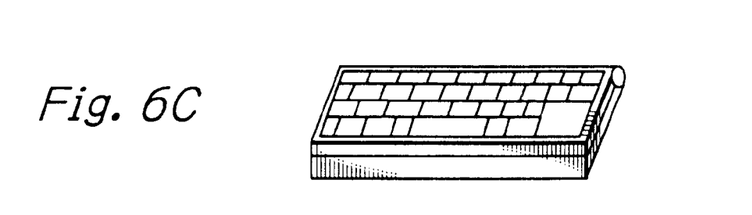

As shown in FIGS. 6A, 6B and 6C, the portable terminal 2 has an LCD 4 and a keyboard 5 connected together at one side thereof. The LCD 4 and keyboard 5 are movable relative to each other about a connecting portion to a desired angular position. As shown in FIG. 6A, to input data on the portable terminal 2, the keyboard 5 and LCD 4 are positioned such that their surfaces make a preselected angle therebetween. As shown in FIG. 6B, to carry the terminal 2, the LCD 4 and keyboard 5 are folded up in a box-like configuration with the display surface of the LCD 4 and the key surface of the keyboard 5 facing each other. In this condition, the rear of the LCD 4 and that of the keyboard 5 form the outer surfaces of the box and protect the keys of the keyboard 5 and the display surface of the LCD 4 from damage. Further, as shown in FIG. 6C, to mount the portable terminal 2 to the apparatus body 1, the LCD 4 and keyboard 5 are folded up such that the rear of the LCD 4 and that of the keyboard 5 face each other, and then the terminal 2 is mounted to the apparatus body 1 with the top of the keyboard 5 facing upward (the LCD 4 facing downward). In this condition, the keyboard 5 can be operated on the apparatus body 1.

Specific circuitry included in the apparatus body 1 and portable terminal 2 will be described with reference to FIG. 7. While signals may be interchanged between the body 1 and the terminal 2 in the form of electric signals, radio waves, infrared beams or acoustic waves, the illustrative embodiment uses infrared beams by way of example.

Figure 7:
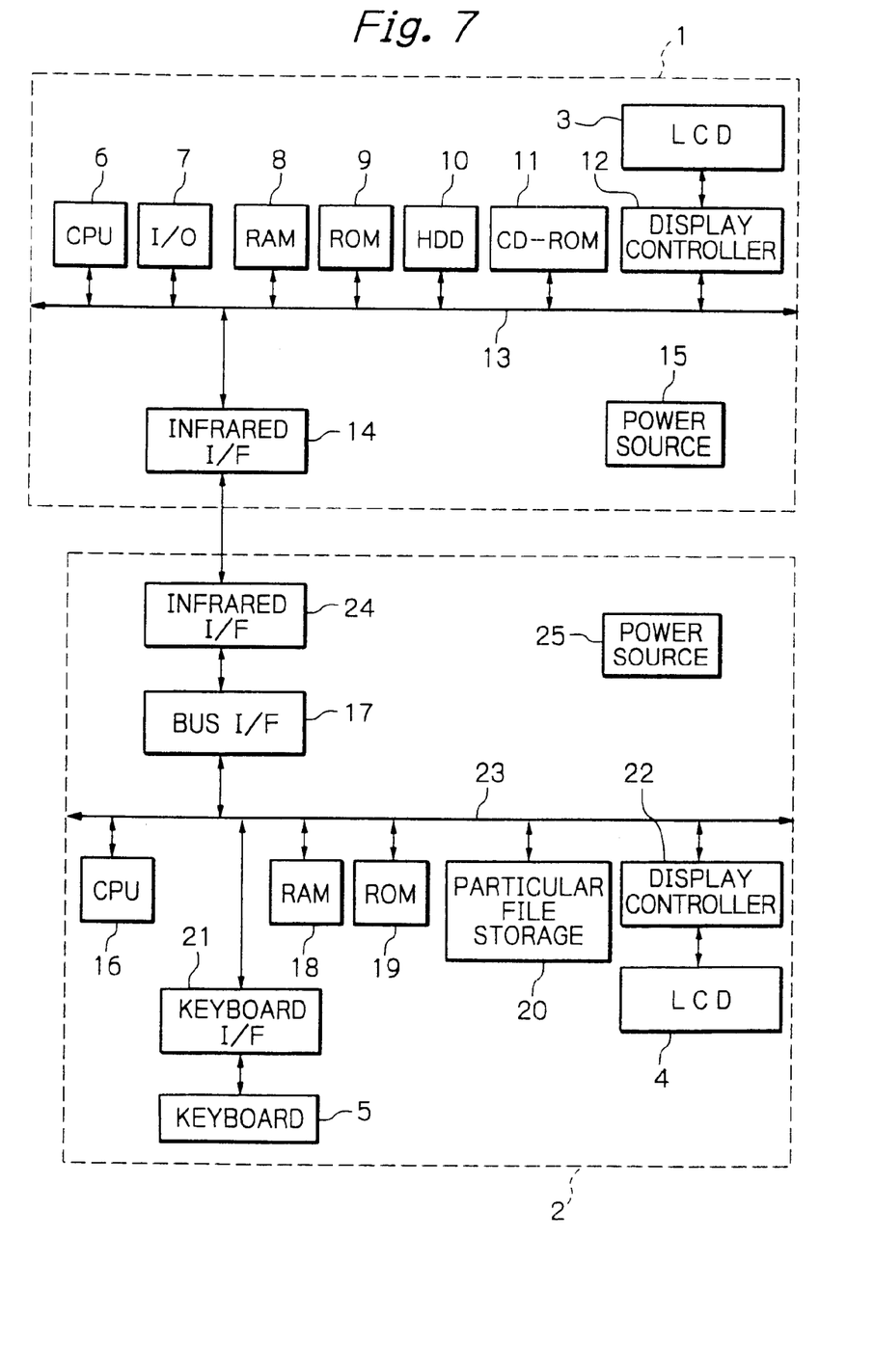
FIG. 7 is a block diagram schematically showing circuitry included in the illustrative embodiment.

As shown in FIG. 7, the apparatus body 1 includes a CPU 6 and an input/output (I/O) section 7, a RAM (Random Access Memory) 8, a ROM (Read Only Memory) 9, a hard disk drive (HDD) 10, a CD-ROM (Compact Disk ROM) 11, a display controller 12 and an infrared interface 14 connected to the CPU 6 by a CPU bus 13. In addition, the body 1 includes the LCD 3 connected to the display controller 12 and a power source 15 for feeding power to such components of the apparatus body 1. The portable terminal 2 includes a CPU 16 and a bus interface (I/F) 17, a RAM 18, a ROM 19, a particular file storage 20, a keyboard I/F 21 and a display controller 22 connected to the CPU 16 by a CPU bus 23. An infrared I/F 24 is connected to the bus I/F 17. The LCD 4 and keyboard 5 are connected to the display controller 22 and keyboard I/F 21, respectively. A power source 25 feeds power to such components of the terminal 2.

The construction of the apparatus body 1 will be described more specifically hereinafter. The CPU 6 controls the entire apparatus when the portable terminal 2 is mounted to the apparatus body 1 or controls the input/output and computation of the entire apparatus when used alone. A mouse or similar input device, not shown, is connected to the I/O section 7. When the apparatus body 1 is used alone, the CPU 6 controls the various sections of the body 1 in accordance with information input from the input device. The RAM 8, ROM 9, HDD 10 and CD-ROM 11 store a program (software) for operating the apparatus, a data file, and input data. The HDD 10, for example, stores schedule management software for formulating a work schedule for the development and maintenance of software and for estimating and adjusting the progress of the work, and stores a schedule data file based on the schedule management.

The display controller 12 controls display on the LCD 3. For example, the display controller 12 transforms data read out of any one of the above storages or data input from the input device to suitable display data and displays the display data on the LCD 3. The infrared I/F 14 includes an emitting/receiving section, not shown, for transmitting and receiving optical signals implemented by infrared rays. The infrared I/F 14 is positioned such that it faces the infrared I/F 24 of the portable terminal 2 when the terminal 2 is mounted to the body 1.

In the portable terminal 2, the CPU 16 controls the input/output and computation of the entire terminal 2 when the terminal 2 is removed from the body 1. When the terminal 2 is mounted to the body 1, the CPU 16 does not operate, i.e., the terminal 2 is controlled by the CPU 6 of the body 1. The RAM 18, ROM 19 and particular file storage 20 store a program (software) for operating the terminal 2 when the terminal 2 is used alone. This software includes data files, and input data, e.g., schedule management software and schedule data file. In the illustrated embodiment, the schedule data file and other particular data files are stored in the particular file storage 20. Data is input and output from such storages under the control of the CPU 16 when the terminal 2 is used alone or by the CPU 6 of the body 1 when the terminal 2 is mounted to the body 1.

When any key on the keyboard 5 is pressed, the keyboard I/F 21 outputs a particular key code corresponding to the key. The display controller 22 controls display on the LCD 4. For example, the display controller 22 transforms data read out of any one of the above storages or data input via the keyboard 5 to suitable display data and displays the display data on the LCD 4. Such display of data on the LCD 4 is effected only when the terminal 2 is used alone.

The infrared I/F 24 is identical in configuration with the infrared I/F 14 of the body 1 and interchanges optical signals with the I/F 14. The bus I/F 17 operates only when the terminal 2 is set on the body 1 with its CPU 16 remaining inoperative. Specifically, the bus I/F 17 controls the reading and writing of data in the RAM 18 or the particular file storage 20 or sends data input on the keyboard 5 to the body 1 via the infrared I/F 24. The power source 25 is implemented by a battery and used when the terminal 2 is operated alone. For the battery, use may be made of a solar battery implemented by CMOS semiconductor devices.

While the terminal 2 should preferably be as small as possible for enhancing portability, practical design should give consideration to the manipulability of the keyboard 5 and the screen size of the LCD 4.

The use of the data processing apparatus having the above construction will be described specifically hereinafter. First, assume that the portable terminal 2 is operated on the apparatus body 1, as shown in FIG. 5. In this condition, the power supply from the power source 25 of the terminal 2 is shut off, and the power source 15 of the body 1 feeds power to the keyboard 5, bus I/F 17, RAM 18, particular file storage 20, keyboard I/F 21, and infrared I/F 24. If desired, an arrangement may be so made as to charge the power source 25 of the terminal 2 at the same time. Such switching of the power source is effected mechanically when the terminal 2 is mounted to the body 1. For example, a mechanical device or a sensor may be included in the body 1 in order to determine whether or not the terminal 2 is set at a preselected position on the body 1. When the terminal 2 is mounted to the body 1, the terminal 2 plays the role of a storage in addition to the role of a keyboard.

Assume that the terminal 2 serves as a keyboard and that a certain key on the keyboard 5 is pressed. Then, the keyboard I/F 21 outputs a key code corresponding to the pressed key. The key code is fed to the infrared I/F 24 via the bus I/F 17. The infrared I/F 24 converts the input key code to a corresponding optical signal and sends it to the infrared I/F 14 of the apparatus body 1. The CPU 6 of the apparatus body 1 controls the various sections of the body 1 in accordance with the key code received via the infrared I/F 14.

The terminal 2 is capable of functioning as a storage, as follows. When the CPU 6 of the body 1 sends a request for accessing the particular file storage 20 to the terminal 2, the bus l/F 17 writes or reads data in or out of the particular file storage 20. Specifically, in the case of data reading, the bus I/F 17 controls the reading of data out of the storage 20 and delivers the data read out to the infrared I/F 24. The infrared I/F 24 sends the data to the infrared I/F 14 of the body 1. In the case of writing, data is sent from the infrared I/F 14 to the infrared I/F 24. The bus I/F 17 writes the received data in the particular file storage 20. On the other hand, when data is input on the keyboard 5, the bus I/F 17 controls the writing of data based on key codes output from the keyboard I/F 21 in the particular file storage 20. It is to be noted that data may be written and read out of the other storage (RAM) in the same manner.

In the above condition, the CPU 6 of the apparatus body 1 allows data to be written and read out of the terminal 2, allows data to be input on the keyboard 5 of the terminal 2, and allows such data to be displayed on the LCD 3. Data may be input not only on the keyboard 5 of the terminal 2 but also via a mouse or similar input device connectable to the I/O section 7.

Now, assume that the terminal 2 is removed from the apparatus body 1 and operated alone (see FIGS. 6A–6C). When the terminal 2 is removed from the body 1, the power source 25 of the terminal 2 feeds power to the various sections of the terminal 2. At the same time, the CPU 16 starts controlling the terminal 2. This is effected mechanically in the same manner as when the terminal 2 is mounted to the body 1.

Specifically, the keyboard 5 and LCD 4 of the terminal 2 are held at a preselected angle relative to each other, as shown in FIG. 6A. In this condition, the CPU 16 allows data to be input on the keyboard 5, allows data to be written and read out of the RAM 18 or the particular file storage 20, and allows such data to be displayed on the LCD 4.

When the terminal 2 is to be carried by the user, the terminal 2 is folded up, as shown with reference to FIG. 6B. In this case, an arrangement may be made such that power output from the power source 25 is fed to only particular sections of the terminal 2. This is successful to interrupt power supply to, e.g., the LCD 4 having a relatively great capacity. This can also be done with an arrangement for detecting the folding of the terminal 2 either mechanically or electrically. This kind of arrangement is particularly effective when it comes to a portable data terminal powered by a battery.

Assume that the apparatus body 1 is operated alone, i.e., with the terminal 2 removed from the body 1. In this case, a mouse or similar input device is connected to the I/0 section 7 for inputting data while data is displayed on the LCD 3, as is conventional.

As stated above, in the illustrative embodiment, the terminal 2 may be operated on the body 1 in combination or operated alone, as desired. Body 1 can also be operated alone.

Schedule management available with the illustrative embodiment is as follows. Assume that the body 1 and terminal 2 each is loaded with schedule management software. The terminal 2 is used alone and outside a combination with body 1 in order to see a schedule based on the schedule management software stored in the terminal 2. At this instant, updated data is written to the particular file storage 20 as a schedule data file. To update the schedule, use is made of application software also stored in the terminal 2.

Thereafter, the terminal 2 is mounted to the body 1 and operated to see or update the schedule based on the schedule management software of the body 1. It is therefore possible for the user to see the schedule data file stored in the particular file storage 20 and confirm the data updated when terminal 2 and body 1 were separated. Again, when the schedule is updated, it is written to the particular file storage 20 as a schedule data file.

Because the body 1 shares the particular file storage 20 of the terminal 2 with the terminal 2, only a single schedule data file should be managed. Managing a single schedule data file is far easier than managing the conventional two schedule data files.

If desired, a modem for transforming one of a digital signal and an analog signal to the other may be additionally included in the terminal 2, so that the terminal 2 can be connected to a communication network. Specifically, a portable telephone may be connected to another personal computer via the terminal 2 and a communication network.

In summary, it will be seen that the present invention provides a data processing apparatus having various unprecedented advantages, as enumerated below.

(1) An apparatus having a high processing ability, i.e., a desk-top personal computer and a portable data terminal can share, e.g., a single schedule data file.

(2) The portable data terminal plays the role of a keyboard when mounted to the apparatus body, so that a single keyboard suffices for use, both when terminal 2 and body 1 are operated in combination, and when used separately.

(3) It is not necessary for the portable data terminal to send a data file to the apparatus body. Therefore, the conventional software and hardware for file transfer are not necessary. This successfully reduces the cost of the apparatus and enhances easy operation.

(4) The apparatus is free from the problem of the conventional terminal that a file having stored new data cannot be located.

(5) The apparatus is foldable in a box-like configuration and therefore easy to carry.

Various modifications will become possible for those skilled in the art after receiving the teachings of the present disclosure without departing from the scope thereof.

What is claimed is:

1. A data processing apparatus comprising:
an apparatus body including a first CPU;
a portable terminal connectable to said apparatus body, said portable terminal including an input device, a second CPU, and a memory;
wherein when said portable terminal is separated from said apparatus body, said portable terminal is effective to function as a data terminal controlled by said second CPU, and when said portable terminal is combined with said apparatus body, said first CPU controls the functioning of said portable terminal including the functioning of said memory and said portable terminal functions as said input device and as a storage for said data processing apparatus.

2. An apparatus as claimed in claim 1, wherein:
said input device includes a keyboard; and
said portable terminal further includes a display rotateably coupled to said keyboard.

3. An apparatus as claimed in claim 2, wherein:
said display has a front portion where images are displayed and a rear portion;
said keyboard has a front portion where keys are disposed and a rear portion; and
when said portable terminal is coupled to said apparatus body, said display and said keyboard are folded with respect to one another so that said rear portion of said display and said rear portion of said keyboard face each other and said front portion of said keyboard faces upward.

4. An apparatus as claimed in claim 2, wherein:
said display has a front portion where images are displayed and a rear portion;
said keyboard has a front portion where keys are disposed and a rear portion; and
said portable terminal is foldable in a box-like configuration such that said front portion of said display and said front portion of said keyboard face each other and said rear portion of said display and said rear portion of said keyboard form outer surfaces of said box-like configuration.

5. An apparatus as claimed in claim 1, wherein:
said portable terminal includes a memory which is effective to store a data file; and
said portable terminal is effective to share said data file with said first CPU of said apparatus body.

6. An apparatus as claimed in claim 5, wherein:
said first and second CPUs are each effective to perform a schedule managing function; and wherein
when said portable terminal is coupled to said apparatus body, a schedule is managed by said first CPU; and
when said portable terminal is not coupled to said apparatus body, said schedule is managed by said second CPU.

7. An apparatus as claimed in claim 1, wherein:
said apparatus body and said portable terminal include first and second power sources, respectively;
when said portable terminal is coupled to said apparatus body, said first power source feeds power to said apparatus body and preselected circuitry of said portable terminal; and
when said portable terminal is not coupled to said apparatus body, said second power source feeds power to said portable terminal.

8. An apparatus as claimed in claim 1, wherein said portable terminal comprises a modem that transforms one of a digital signal and an analog signal to the other of said analog signal and digital signal, said portable terminal being connectable to a communication network via said modem.

9. A data processing apparatus comprising:
an apparatus body;
a portable terminal connectable to said apparatus body and including a keyboard; wherein:
when said portable terminal is separated from said apparatus body, said portable terminal is operable to function as a data terminal;
when said portable terminal is combined with said apparatus body, said portable terminal functions as a keyboard and a storage for said data processing apparatus;
said apparatus body and said portable terminal include first and second power sources, respectively;
when said portable terminal is coupled to said apparatus body, said first power source feeds power to said apparatus body and preselected circuitry of said portable terminal; and
when said portable terminal is not coupled to said apparatus body, said second power source feeds power to said portable terminal.

10. A data processing apparatus comprising:
an apparatus body;
a portable terminal connectable to said apparatus body, said portable terminal including an input device; wherein:
when said portable terminal is separated from said apparatus body, said portable terminal is effective to function as a data terminal;
when said portable terminal is combined with said apparatus body, said portable terminal functions as said input device and as a storage for said data processing apparatus;

said portable terminal further includes a display rotateably coupled to said keyboard;

said display has a front portion where images are displayed and a rear portion;

said keyboard has a front portion where keys are disposed and a rear portion; and when said portable terminal is coupled to said apparatus body, said display and said keyboard are folded with respect to one another so that said rear portion of said display and said rear portion of said keyboard face each other and said front portion of said keyboard faces upward.

11. The data processing apparatus as claimed in claim 10, wherein said input device is a keyboard.

12. The data processing apparatus as claimed in claim 10, wherein when said portable terminal is not coupled to said apparatus body, said portable terminal is foldable in a box-like configuration such that said front portion of said display and said front portion of said keyboard face each other and said rear portion of said display and said rear portion of said keyboard form outer surfaces of said box-like configuration.

13. A data processing apparatus comprising:

an apparatus body including a first CPU;

a portable terminal connectable to said apparatus body, said portable terminal including an input device and a second CPU; wherein:

when said portable terminal is separated from said apparatus body, said portable terminal is effective to function as a data terminal controlled by said second CPU, and when said portable terminal is combined with said apparatus body, said portable terminal is controlled by said first CPU and functions as said input device and as a storage for said data processing apparatus;

said input device includes a keyboard;

said portable terminal further includes a display rotateably coupled to said keyboard;

said display has a front portion where images are displayed and a rear portion;

said keyboard has a front portion where keys are disposed and a rear portion; and when said portable terminal is coupled to said apparatus body, said display and said keyboard are folded with respect to one another so that said rear portion of said display and said rear portion of said keyboard face each other and said front portion of said keyboard faces upward.

\* \* \* \* \*